Feb. 18, 1958    W. P. GALLAGHER ET AL    2,824,181
AUTOMATIC AND MANUAL CONTROL TIME SWITCH
Filed Nov. 12, 1953    6 Sheets-Sheet 1
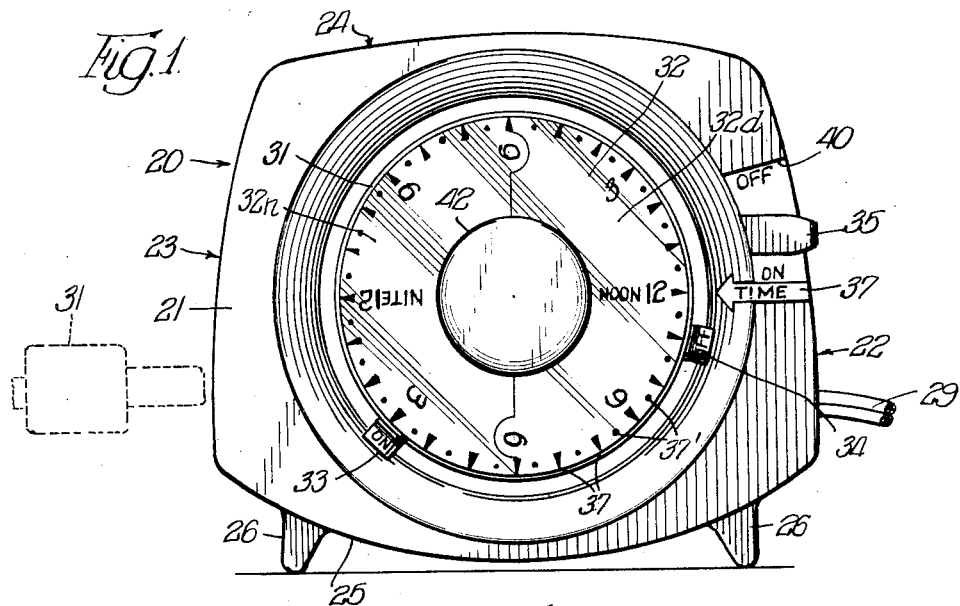
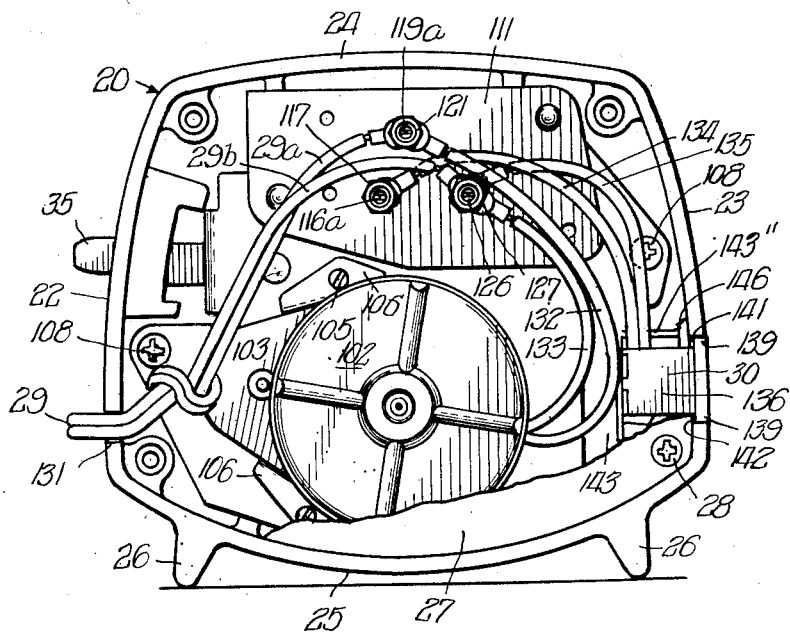
INVENTORS:
William P. Gallagher,
Anthony Dan Stolle,
Paul G. Bielik,
By Brown, Jackson, Boettcher & Drenner
attys.

Feb. 18, 1958 W. P. GALLAGHER ET AL 2,824,181
AUTOMATIC AND MANUAL CONTROL TIME SWITCH
Filed Nov. 12, 1953 6 Sheets-Sheet 2
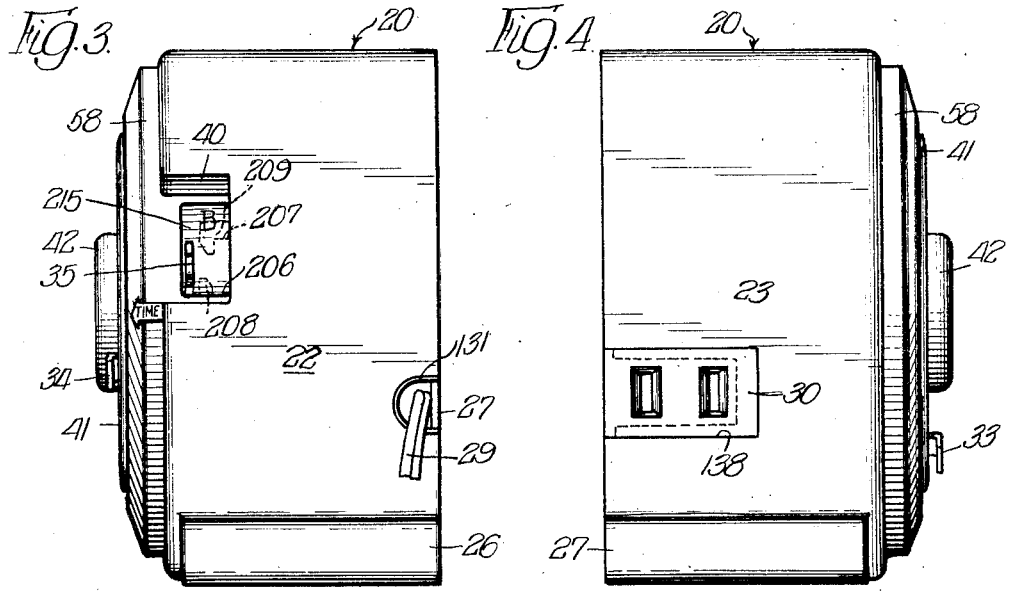
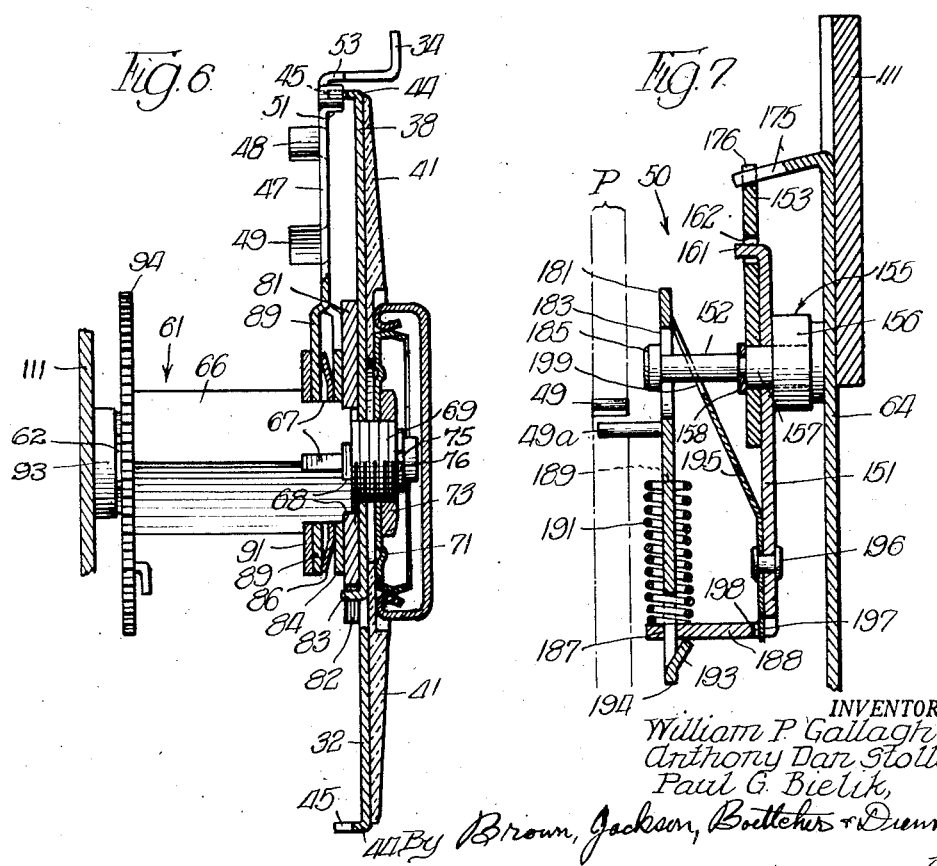
INVENTORS.
William P. Gallagher,
Anthony Dan Stolle,
Paul G. Bielik,
By Brown, Jackson, Boettcher & Dienner
Attys.

Feb. 18, 1958  W. P. GALLAGHER ET AL  2,824,181
AUTOMATIC AND MANUAL CONTROL TIME SWITCH
Filed Nov. 12, 1953  6 Sheets-Sheet 3
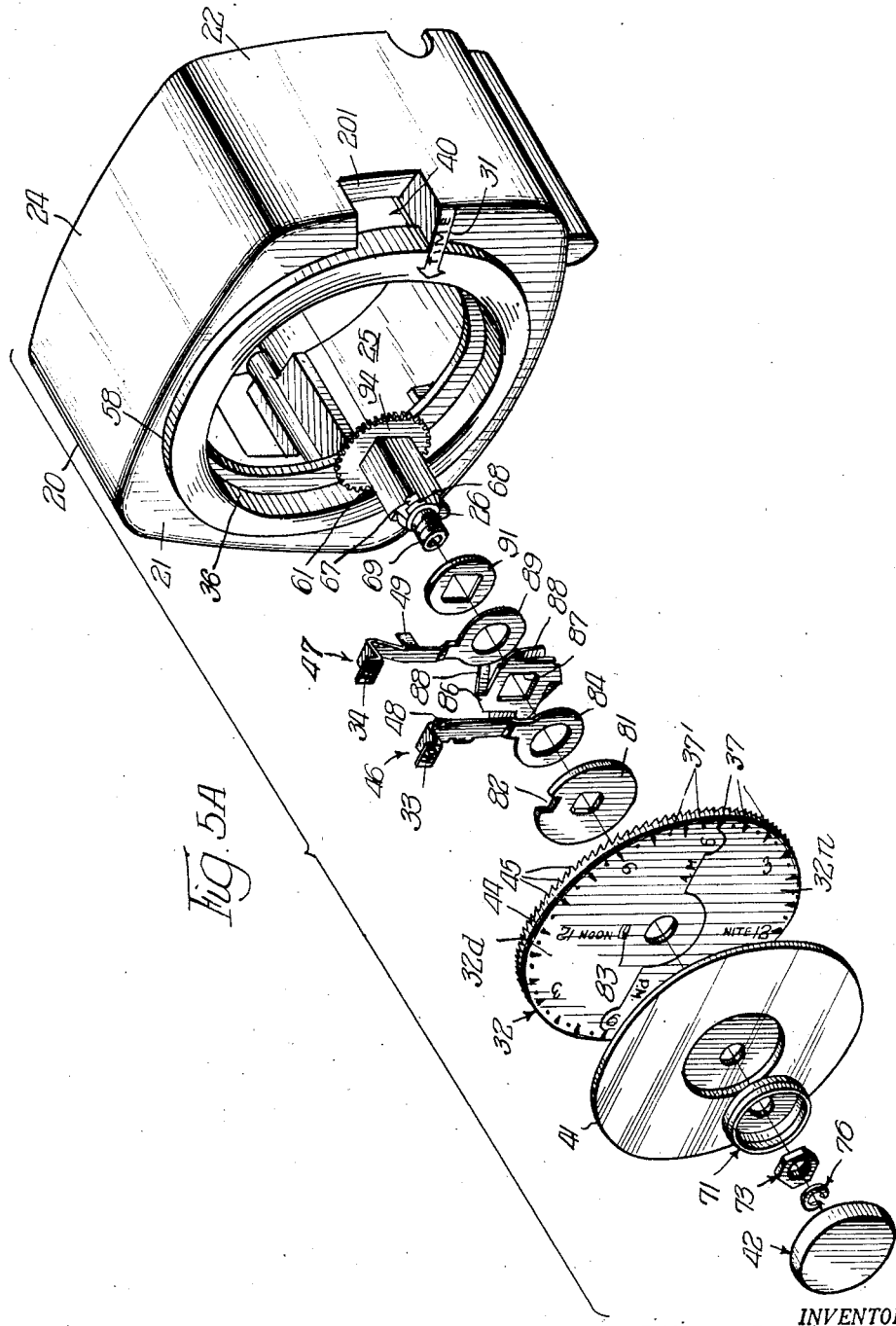
INVENTORS.
William P. Gallagher,
Anthony Dan Stolle,
Paul G. Bielik,
By Brown, Jackson, Boettcher & Dienner
ATTYS.

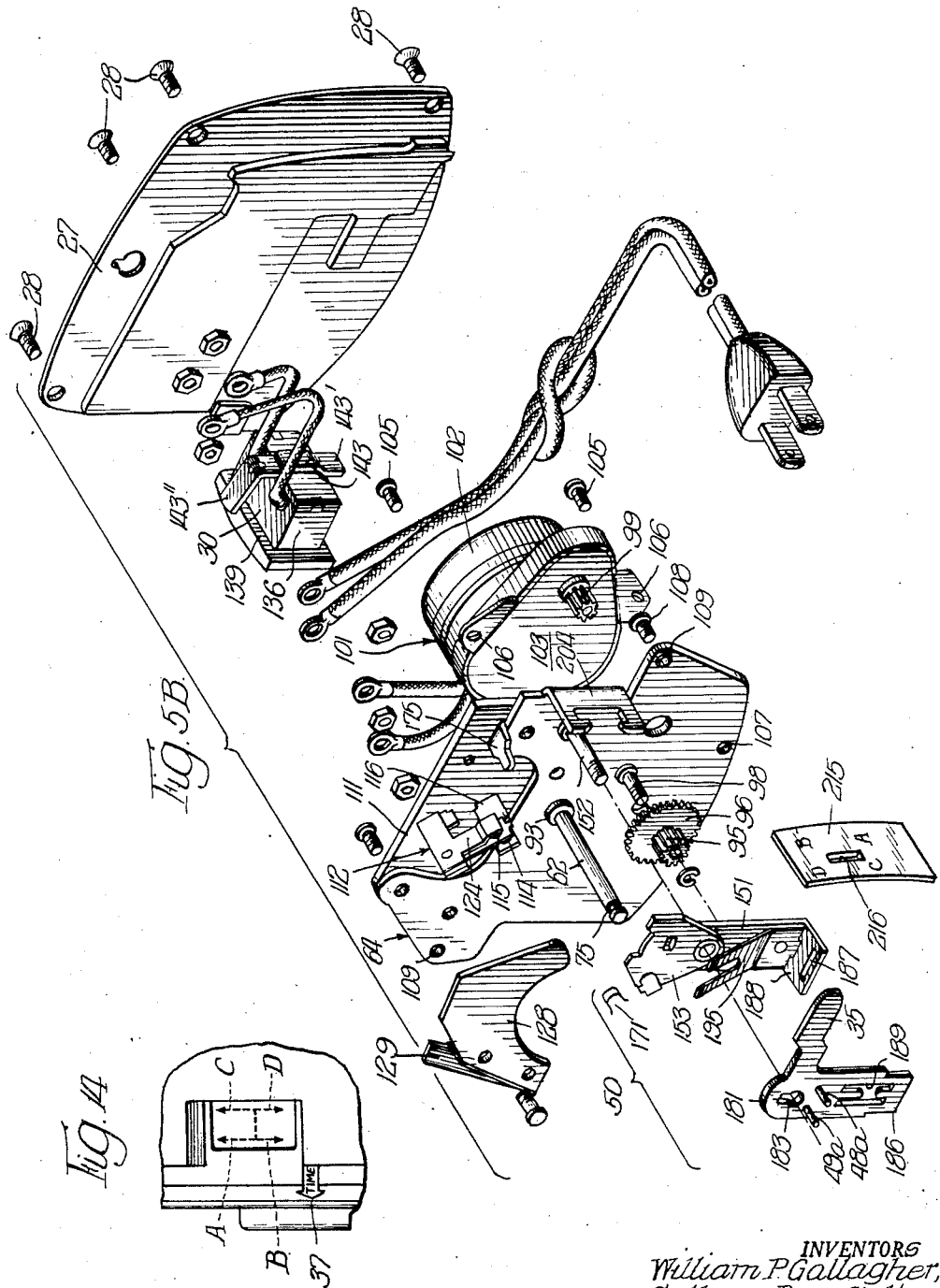

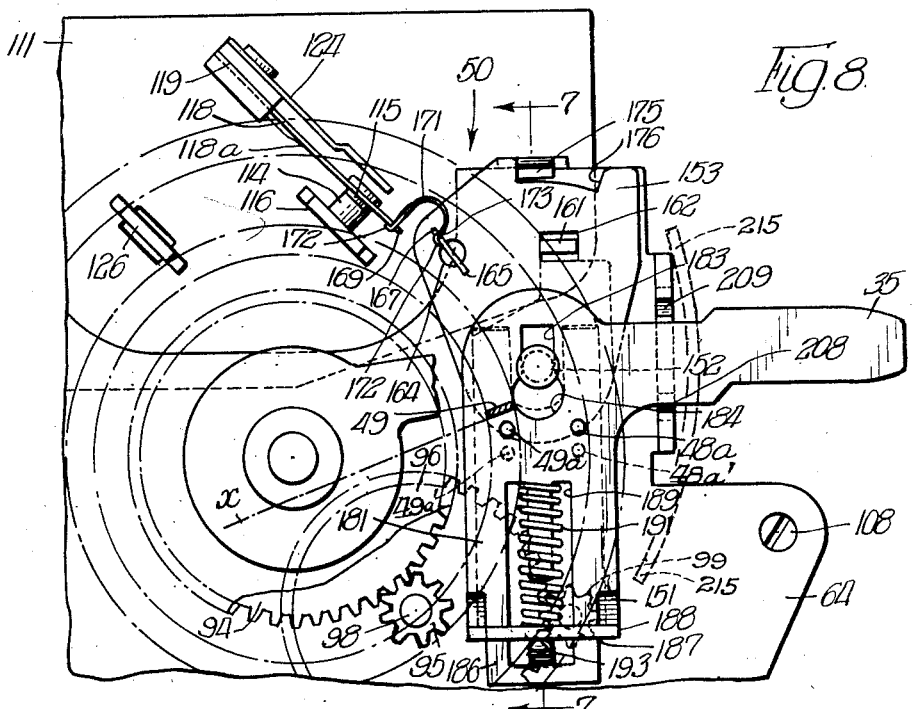
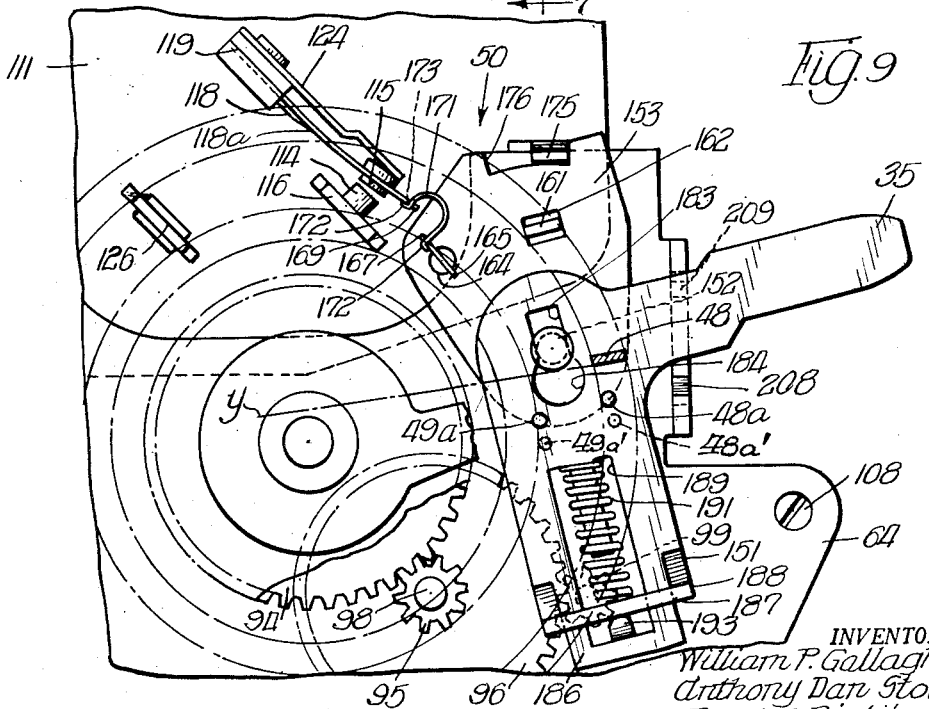

Feb. 18, 1958     W. P. GALLAGHER ET AL     2,824,181
AUTOMATIC AND MANUAL CONTROL TIME SWITCH
Filed Nov. 12, 1953     6 Sheets-Sheet 6
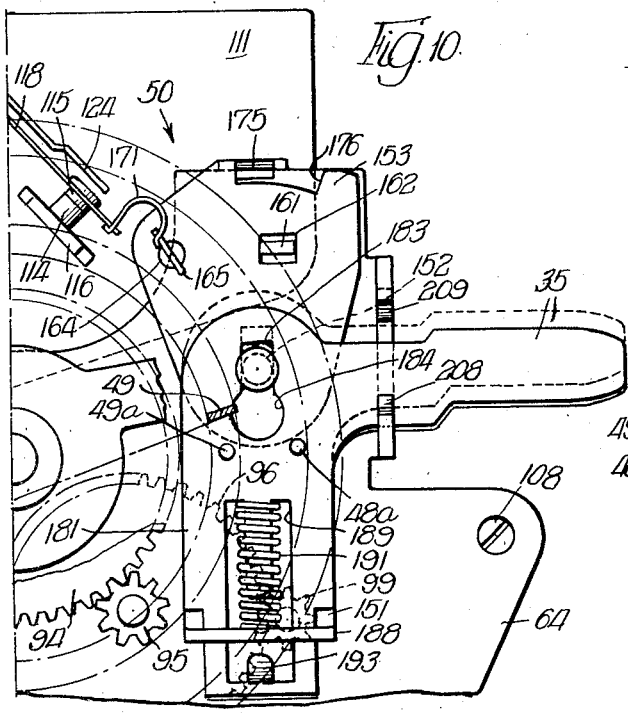
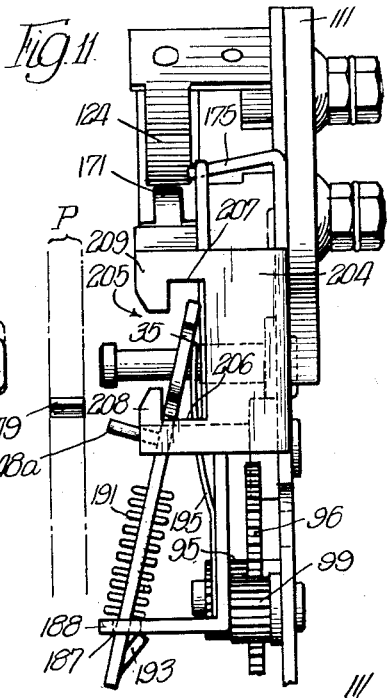
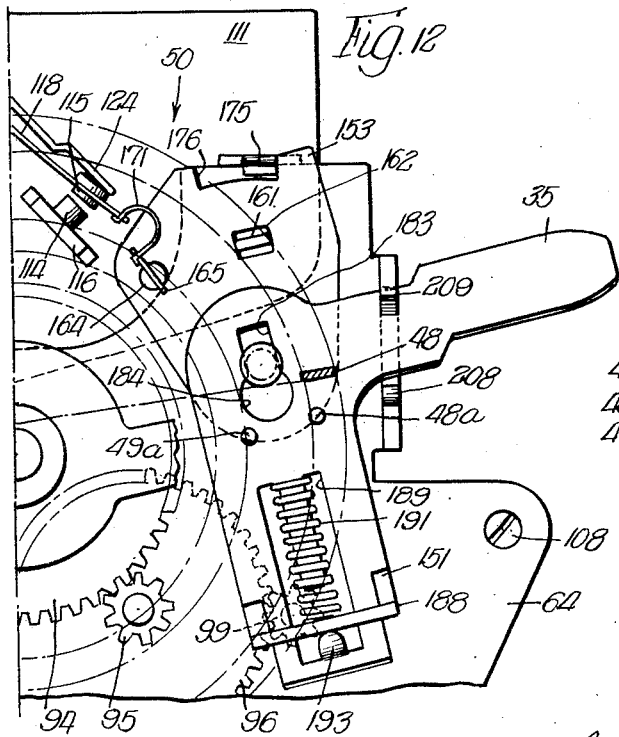
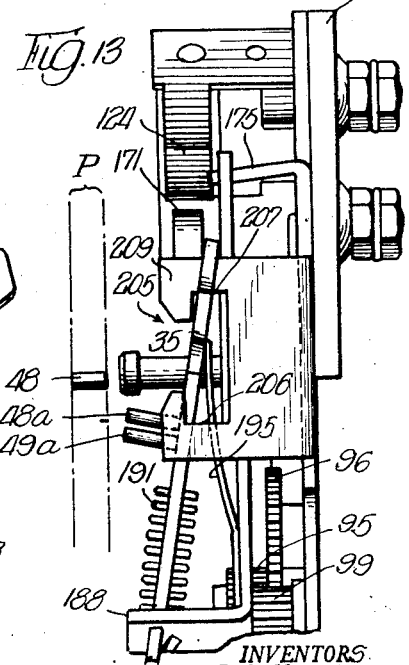
INVENTORS
William P. Gallagher,
Anthony Dan Stolle,
Paul G. Bielik,
By Brown, Jackson, Boettcher & Dienner
Attys United States Patent Office 2,824,181
Patented Feb. 18, 1958

2,824,181

AUTOMATIC AND MANUAL CONTROL TIME SWITCH

William P. Gallagher, Anthony Dan Stolle, and Paul G. Bielik, Chicago, Ill., assignors to International Register Company, Chicago, Ill., a corporation of Illinois Application November 12, 1953, Serial No. 391,464

18 Claims. (Cl. 200—35)

The present invention relates generally to time switches, and more specifically to an automatic and manual control time switch, preferably of portable type, adapted particularly for use in the home for the control of electrical appliances, lighting circuits, etc.

One of the general objects of the invention is to provide an improved time switch for use in the home that is fully automatic in the sense that it does not have to be reset each day. This automatic recycling operation is based upon a 24-hour cycle, using a 24-hour day and night dial, so that a switching operation preset to occur only during the day will never occur during the night, and a switching operation preset to occur only during the night will never occur during the day.

One of the more specific objects of the invention is to provide such a time switch that will enable all of the desired automatic and manual control functions for controlling an electrical appliance, lighting circuit or the like to be performed at one common control point, that is to say, at our improved time switch. Many of the conventional time switches currently in use do not provide a separate manual control at the time switch housing, which requires that the extension cord and plug of the electrical appliance be plugged into and unplugged from the time switch for obtaining this manual control, or that a separate manual switch in the extension cord or at the appliance be operated into open or closed position to obtain this manual control. The plugging and unplugging of the extension cord is an awkward, inconvenient operation, and the operation of the separate manual switch in the extension cord or at the appliance introduces complications and difficulties because the user may not remember having previously operated the secondary switch, or may not be able to tell whether this secondary switch is in its open or closed position. Other conventional time switches currently in use have a manual control which gives a limited type of manual operation, but none of these time switches gives a temporary on-and-off manual control and also a permanent on-and-off manual control superposed upon the automatic time control, and all operable from a common control point at the time switch housing, such as in our improved automatic and manual control time switch herein disclosed.

Thus, it is another object of the invention to provide a time switch characterized by improved multiple-selection automatic and manual controls which enable six different control functions or operations to be performed at the time switch itself to wit:

(1) Automatic On—the automatic operation of turning the electrical appliance or lighting circuit on at a preselected time, either of the night or of the day, this occurring in a continuously repeating cycle.

(2) Automatic Off—the automatic operation of turning the electrical appliance off at a preselected time, either of the night or of the day, this occurring in a continuously repeating cycle.

(3) Temporary On—the manual operation of temporarily turning the electrical appliance on at any desired time—notwithstanding the fact that the timer is then in Automatic Off condition (2), this Temporary On condition (3) thus set up in the timer switch being temporary in the sense that the switch is automatically restored to Automatic Off condition (2) in the next repeating cycle, i. e. by the next tripping actuation effected by the automatic Off tripper.

(4) Temporary Off—the manual operation of temporarily turning the electrical appliance off at any desired time, notwithstanding the fact that the timer is then in Automatic On condition (1), this Temporary Off condition (4) thus set up in the timer switch being temporary in the sense that the switch is automatically restored to Automatic On condition (1) in the next repeating cycle, i. e. by the next tripping actuation effected by the Automatic Off tripper.

(5) Permanent On—the manual operation of permanently turning the electrical appliance on at any desired time, irrespective of the positions of the Automatic Off tripper and the Automatic On tripper, and the timer switch remaining in this Permanent On condition until manually restored either to automatically controlled conditions (1) or (2), or to Temporary On condition (3), or to Temporary Off condition (4).

(6) Permanent Off—the manual operation of permanently turning the electrical appliance off at any desired time, irrespective of the positions of the Automatic Off tripper and the Automatic On tripper, and the timer switch remaining in this Permanent Off condition until manually restored either to automatically controlled conditions (1) or (2), or to Temporary On conditions (3) or to Temporary Off condition (4).

Another object of the invention is to provide an improved construction of time switch, which, upon automatic operation of the contacts either into the closed position or into the open position at the time preset on the time dial, will permit immediate manual operation of the contacts back into the original position—if such is desired—without having to wait for clearance to be established between the related tripping lug and tripping pin, as heretofore necessary in the majority of these time switches.

Another object of the invention is to provide a time switch having the above described features and advantages which will be simple and easy to set and operate, so that its use will not be confusing to a housewife or other person unskilled in the intricacies of automatic time switches.

Another object of the invention is to provide a time switch of the above general description which will be of simple, inexpensive construction so that it can be sold at a low price.

Other objects, features and advantages of the invention will appear from the following detail description of one preferred embodiment of our invention. In the accompanying drawings illustrating such embodiment:

Figure 1 is a front elevational view of our improved time switch;

Figure 2 is a rear view, with part of the rear cover plate broken away;

Figure 3 is an elevational view of the right hand side of the housing, showing the opening through which the manual control lever extends for movement into its four selective manual control positions;

Figure 4 is a fragmentary view of the opposite side of the housing, showing the outlet socket into which is plugged the extension cord leading to the electrical appliance or lighting circuit to be controlled;

Figure 5A–5B is an exploded perspective view showing the various parts of the time switch in separated aligned relation;

Figure 6 is a detail sectional view through the continuously revolving 24-hour dial, showing the adjustable mounting of the automatic On and Off trippers carried by this dial;

Figure 7 is a longitudinal sectional view, taken approximately on the plane of the line 7—7 of Figure 8 through the switch actuator, which is responsive to automatic time operation and also to manual operation.

Figure 8 is a fragmentary view showing the switch actuating mechanism in the switch closing position and about to be actuated into the switch opening position by the "Off" tripper carried by the rotating time dial;

Figure 9 is a view similar to Figure 8, but illustrating the switch actuating member in the switch open position, and about to be actuated into the switch closing position by the "On" tripper rotating with the time dial;

Figures 10 and 11 are fragmentary front and side views respectively showing the operation and position of the parts when the manual control lever is moved into the permanent "On" position, Figures 12 and 13 are views similar to Figures 10 and 11, but illustrating the operation and position of the parts when the manual control lever is moved into the permanent "Off" position; and Figure 14 is a diagram showing the four positions of the manual control lever.

Referring to Figures 1–5, the time switch mechanism is enclosed within a housing 20, which is preferably in the form of a molded plastic unit composed of any suitable plastic typically represented by urea formaldehyde ("Plaskon") or the like. This molded plastic housing comprises a front wall 21, right and left hand side walls 22 and 23, and top and bottom walls 24 and 25. The bottom wall 25 is formed with downwardly extending spaced ribs 26 extending substantially the depth of the housing, the lower surfaces of these ribs being rounded to provide smooth supporting feet which will not scratch a delicate surface. The back side of the housing 20 is left open for the insertion of the operating mechanism, following which a rear cover plate 27 is secured to the housing by screws 28 to close this open rear side of the housing.

The current supply to the time switch is through the usual cord set 29 which extends from a conventional prong or screw type of connector plug and enters the housing through a slot in the side wall 22 of the housing (Figure 3). Mounted in the opposite side wall 23 of the housing is an outlet receptacle 30 (Figure 4) into which is plugged the conventional prong type of connector plug and extension cord (indicated in dotted lines at 31 in Figure 1) leading to the electrical appliance or lighting circuit to be controlled.

It is believed that a ready understanding of the detailed description of the operating parts of the timer will be facilitated by first designating briefly at this point the automatic and manual controls:

(1) The automatic control functions are performed by the continuously rotating 24-hour time dial 32 (Figure 1), and by the relatively adjustable On and Off switch tripping arms which rotate with this dial, these two tripping arms being represented by the On finger tab 33 and by the Off finger tab 34, both of which project from the edge of the time dial 32, and both of which can be given different switch tripping settings relatively to the dial.

(2) The manual control functions are performed by a manual control lever 35 which projects from a slotted opening 40 in the right hand side of the housing. This manual control lever 35 can be moved selectively into any one of four different control positions, comparable to the movement of an automobile transmission lever into the four positions of an H-slot, for obtaining the above described manual control conditions of: temporary on, temporary off, permanent on and permanent off.

Referring now to the detailed construction of the timer, the front wall 21 of the housing is formed with a large circular opening 36, in which revolves the 24-hour time dial 32. The face of the dial 32 is marked off into semicircular halves 32d and 32n to denote the day and night halves of the dial, the daytime half 32d being of a relatively light color or shade to denote the 12 hours of the day from 6:00 a. m. to 6:00 p. m., and the night time half of the dial 32n being of a darker color or shade to correspond to the 12 hours of the evening from 6:00 p. m. to 6:00 a. m. Spaced around each day and night half of the dial are the hour numerals 6, 9, 12 and 3, and intermediate these numerals are the full hour markings 37 and the half-hour markings 37', it being understood that finer degrees of graduation may be provided if desired. These time markings on the dial 32 are adapted to be read in registry with the arrow 38 marked "Time" molded into the case adjacent to the right hand side of the housing. When the time switch is first connected into the electrical supply circuit at the time of installation, it is necessary to rotate the 24-hour time dial manually to place the proper hour designation of the night or day in registry with the time indicating arrow 38, corresponding to the time when the device is connected into the circuit. To facilitate this operation of manually setting the time dial, and also to facilitate the operation of setting the automatic On and automatic Off trippers carried by this dial, we prefer to dispense with any outer cover glass over the dial assembly, and, instead, to protect the dial face by a clear plastic disc 41 which is secured directly to the front face of the dial and rotates therewith. The plastic protecting disc 41 is held in place in front of the dial by a circular trim cap 42 mounted on the front end of the dial supporting bushing, to be later described, and this trim cap 42 serves as a knob by which the dial can be rotated manually in giving the dial its initial time setting.

The time dial 32 is preferably constructed in the form of a circular sheet metal stamping provided with a rearwardly extending peripheral flange 44. The rear edge of this flange 44 is provided with ratchet teeth 45 uniformly spaced around the entire dial, these teeth coacting with the two tripping arms 46 and 47 (automatic On and automatic Off) rotatably mounted on the back side of the time dial, as will be later described. The ratcheting direction of the teeth 45 is such as to permit adjustment of the automatic On and Off tripping arms 46 and 47 in a clockwise direction relatively to said dial, but normally precluding movement of these arms in a backward or counterclockwise direction relatively to the dial. Thus, these teeth normally transmit a positive drive from the dial to the arms in the forward or clockwise direction of rotation of the dial so that the arms normally rotate directly with the dial. However, if it is desired to manually adjust either one of the tripping arms in a rearward or counterclockwise direction relatively to the dial, in manually setting up the automatic time cycle, this can be easily accomplished by merely springing the tripping arm back out of engagement with the ratchet teeth, the arms being sufficiently flexible to permit this.

The On tripping arm 46 carries a rearwardly bent On tripping lug 48, which is adapted to engage the On tripping pin 48a projecting from a switch actuator 50, to be later described; and, correspondingly, the Off tripping arm 47 carries a rearwardly bent Off tripping lug 49 which is adapted to engage the Off tripping pin 49a also projecting from this switch actuator 50. It will be noted that these two tripping lugs are located at different radii on their respective arms, i. e. the On tripping lug 48 is located further out along its arm 46 than is the Off tripping lug 49 located out along its arm 47.

Each tripping arm is formed with a forwardly bent detent or ratcheting lug 51 which engages with the ratchet teeth 45 formed in the rearwardly projecting edge of the time dial. The outer end of the On tripping arm 46 is bent forwardly at 53 to extend approximately beyond the time dial, and is then bent radially outwardly at 33 to form a finger piece or tab by which this On tripping lever can be manually shifted to different adjusted positions. Similarly, the Off tripping arm 47 has its outer end bent outwardly at 53 and then has its extremity bent radially outwardly at 34 to form a finger piece or tab by which to adjust the Off tripping lever to its different adjusted positions around the time dial. Marked in the outer surface of the finger tab 33 of tripping arm 46 is the indicia "On," and marked in the outer surface of the other finger tab 34 of arm 47 is the indicia "Off." It will be seen that by pressing inwardly on either of these finger tabs the detent lug 51 of the associated tripping arm can be freed from the ratchet teeth of the time wheel, whereupon the tripping arm can be adjusted in either direction, forwardly or backwardly, relatively to the time wheel for any desired setting. In performing setting adjustments in a forward direction with respect to the time wheel, it is not necessary to press the tripping arm inwardly to release the ratchet engagement, because the detent lug 51 can slide over the sloping faces of the ratchet teeth when moving in this direction. The time dial 32 and the adjusting tabs 33 and 34 of the tripping arms rotate continuously within the large circular opening 36 in the front wall of the housing, having a 24-hour cycle of rotation, as before described. The opening 36 is formed as a cup-shaped depression in a raised bezel 58, whereby the outer face of the dial lies substantially flush with the outer edge of the bezel, with the adjusting tabs 33 and 34 overlying the edge of the bezel in close proximity thereto. This gives a very attractive front appearance to the time switch.

Referring now to the rotatable mounting of the time dial and its two tripping arms, the dial is fixedly secured to the forward end of a bushing 61 which is rotatably mounted on a stationary pivot stud 62. The rear end of this pivot stud 62 is anchored to a frame plate 64, which carries the electric motor, switch parts and switch actuator, as will be later described. As shown in Figure 6, the bushing 61 comprises a main shank portion 66, which is preferably of square or other polygonal cross-section. The forward end of the mounting bushing 61 is formed with a first reduced shank portion 67 of polygonal form, a second reduced shank portion 68 of polygonal form, and a reduced threaded step 69. The threaded stem 69 passes through the time dial 32 and through the plastic face plate 41. Assembled over the threaded stem 69 on the front side of the plastic disc 41 is a cup base or mounting ring 71 which sets back into a circular recess in the front of the transparent cover disc 41. A nut 73 screws over the end of the threaded stem 69 and secures the time dial, cover disc and base cup to the threaded stem 69. The stationary mounting stud or post 62 extends entirely through the mounting bushing 61 and projects slightly beyond the threaded shank 69 thereof. This projecting end of the spindle post 62 is provided with an annular groove 75 into which is adapted to be snapped a C-shaped type of lock washer 76. This holds the sub-assembly comprising the bushing 61, time dial 32, tripping arms 46, 47, etc. mounted on the mounting post 62. The cap base 71 has a peripheral flange of slightly wedge-shaped cross section, over which the circular trim cap 42 can be readily snapped and unsnapped. The removal of this trim cap 42 affords access to the C-shaped washer 76 for removing the latter when it is desired to remove the above sub-assembly from the stationary mounting post 62.

Abutting directly against the rear side of the time dial is a relatively large driving washer 81, having a polygonal central opening which has a driving fit over the polygonally shaped shank portion 68 of the bushing 61. The outer edge of this driving washer is notched at 82 for establishing a driving fit with a lug 83 puched rearwardly from the web of the time dial 32. Mounted on the other polygonal shank portion 67 directly in rear of the driving washer 81 is the hub ring 84 of the On tripping arm 46. The opening in this hub ring 84 is circular, so that the tripping arm can be rotatably adjusted relatively to the polygonal shank portion 67. Mounted on this same shank portion 67 directly in rear of the hub ring 84 is a spring tension washer 86. This washer has a square central opening 87, so that it is held against rotation on the polygonal shank portion 67 of the mounting bushing. Spring arms 88 project rearwardly from the web of this spring washer for the purpose of exerting an axial separating force between the hub ring 84 of the On tripping arm 46 and the hub ring 89 of the Off tripping arm 47. This hub ring 89 of the Off tripping arm also has a circular opening for accommodating adjusting rotation of the tripping arm relatively to the polygonal shank portion 67 of the mounting bushing. Disposed in rear of the Off tripping arm hub 89 is a washer 91 having a square central opening which engages over the polygonal shank portion 67 and compels the washer to rotate with the mounting bushing. The action of the spring tension washer 86 is to force the hub portion 84 of the On tripping arm 46 forwardly against the keyed washer 81, and to force the hub portion 89 of the Off tripping arm 47 rearwardly against the other keyed washer 91, whereby there is sufficient pressure of frictional engagement between each of these tripping arms and its respective keyed washer so that an angular adjustment performed on one of these tripping arms, particularly in a forward direction, will not accidentally carry the other tripping arm along with it.

The rear end of the rotatable bushing 61 is adapted to bear gainst a staking flange 93 formed in the rear portion of the stationary spindle 62, this staking flange abutting against the mounting plate in the staked mounting of this spindle in said mounting plate. Staked to the rear end of the rotatable bushing 61 is a spur gear 94 which meshes with a spur pinion 95 constituting part of a speed reducing gear train extending to the synchronous electric motor which drives the time switch. Spur pinion 95 is secured to a large spur gear 96, and this pair of intermediate idler gears is rotatably mounted upon a pivot stud 98 which is staked to the base plate 64. Meshing with the large idler gear 96 is a pinion 99 which constitutes part of the synchronous motor unit and which extends through an aperture in the base plate for meshing with the large idler gear 96. The motor unit, designated 101 in its entirety, comprises a conventional alternating current self-starting synchronous motor 102 having its rotor shaft extending into a gear housing 103 which is secured to the frame of the motor and constitutes part of the motor unit assembly. Enclosed within this gear housing 103 is a train of reduction gearing leading to the drive pinion 99 which projects forwardly from the front side of this gear housing 103. Included within the gear housing 103, either as a part of the speed reducton gearing, or separately therefrom, is a one-way ratchet drive or slippage clutch which permits the drive pinion 99 to be rotated freely in a clockwise direction (as viewed in Figure 5B) relatively to the driving rotor, but does not permit the driving pinion to be rotated independently in the other direction. The operating relation through the speed reduction gear set 95, 96 is such that this permits the time dial 32 to be revolved freely in a forward or clockwise direction in performing the initial time setting operation of setting the time dial to agree with the hour of the day or night when the time switch is first connected into the supply circuit. The electric motor unit 101 is fixedly secured to the outer side of the base plate 64 by cap screws 105 passing through apertured ears 106 extending from the motor unit and threading into tapped holes 107 in the base plate. This base plate is inserted into the housing through the open rear side thereof, and is mounted therein by cap screws 108 passing through holes 109 in the plate and threading into tapped bosses molded within the housing 20 substantially at opposite sides thereof.

Riveted to the outer side of the base plate 64, at its upper edge, is a switch mounting plate 111 composed of insulating material. Mounted on the forward side of this insulating panel 111 is the automatic and manually controlled switch 112 which, in the present instance, is shown as a simple form of single-pole, single-throw switch comprising a stationary contact 114 and a movable contact 115. It will be understood that other combinations of contacts may be arranged to respond to the automatic and manual operation. The stationary contact 114 is riveted to a flat metal post 116 which is staked in an aperture in the insulating panel 111 and which has a flat extension portion 116a projecting from the other side of the insulating panel. This outer extension portion 116a is externally threaded so that it can function as a binding post for receiving binding post nuts 117 (Figure 2). The movable switch contact 115 is secured to a leaf spring 118 having a flexible inner end which is fastened to a terminal post 119, substantially similar to the terminal post 116. The terminal post 119 has staked mounting in the insulating panel 111 and also comprises a threaded binding post extension 119a on the front side of the panel adapted to receive binding post nuts 121. This movable contact mounting post 119 also has a blade stop bracket 124 riveted to its back side, this bracket limiting the range of upward flexure of the leaf spring 118 in the switch opening operation. In order to give the contact carrying outer portion of the leaf spring 118 a desired degree of stiffness, the side edges of this leaf spring are bent downwardly to form the stiffening lips or flanges 118a, these lips terminating short of the mounting post 119, however, so that the inner portion of the spring will have free flexibility. Also staked to the insulating panel 111 is a neutral terminal post 126 having a threaded outer extension over which screw binding post nuts 127. This latter terminal post merely serves as a convenient terminal post for establishing connection between one side of the supply line and the electrical motor and the outlet receptacle. The three terminal posts 116, 119 and 126 may have the same construction and method of mounting in the insulating panel 111 as is disclosed in our co-pending application Serial No. 366,842, filed July 8, 1953, but it will be understood that any other construction and mounting of terminal posts may be employed, if desired. An insulating plate 128 (Fig. 5B) may be secured by a bracket 129 to the front side of base plate 64 to serve as a shield against front arcing or flashing of the switch contacts.

Figure 2 illustrates the circuit connections of the time switch, from which it will be seen that the two supply conductors 29a, 29b of the supply cord set enter the side of the housing through the notched opening 131 and connect respectively to the binding post 119a of the movable switch contact and to the neutral binding post 126. The electric motor 102 receives supply current continuously through conductors 132 and 133 extending from the motor to the binding post terminals 119a and 126. Leading from the binding post terminals 116a of the stationary switch contact is a conductor 134 which connects with one of the terminals of the outlet receptacle 30, and leading from the neutral binding post terminal 126 is another conductor 135 which connects with the other terminal of outlet receptacle 30, from which it will be seen that the supply of current to this outlet receptacle will be controlled directly by the opening and closing of the switch contacts 114, 115. This outlet receptacle 30 is of the conventional prong receiving type, and has its pair of contacts enclosed within a molded plastic housing 136 which matches the appearance of the main housing 20. The receptacle is adapted to be inserted edgewise into a rectangular slot-shaped opening 138 extending forwardly from the rear edge of the housing 20 in the left hand wall 23 thereof. Top and bottom extension lips 139 on the receptacle housing abut against top and bottom ledges 141, 142 formed along the top and bottom edges of the slot-shaped opening 138. An angle-shaped clip 143 is secured to the inner side of the receptacle housing by a screw 144, this clip having a lower end 143′ abutting a rib 145 formed in the main housing below the opening 138 and having an angularly bent upper end 143″ engaging a reinforcing rib 146 formed within the housing above the opening 138.

We shall now describe the improved switch actuator 50 which has the unique two-fold or dual function of responding to the automatic time control exercised by the On and Off tripping arms 46 and 47, and also responding to the four position manual control exercised by the manual control lever 35. As best shown in Figures 7–9, this switch actuator 50 comprises an arm or plate 151 mounted to have swinging movement around a pivot stud 152 staked at its rear end in the base plate 64. Secured to the upper end of the pivoted arm 151 is a switch operating yoke extension 153 composed of insulating material. A mounting bushing or hub 155 (Figure 7) has a large rear portion 156 engaging the back side of the swinging arm 151, and has a reduced extension 157 that extends through said arm and through the insulating yoke extension 153 and is peened over or staked on the front side of the yoke extension. This bushing hub 155 has a free rotative fit on the pivot stud 152, and is held against outward movement along this pivot stud by a snap type of lock washer 158 engaging in a groove in the pivot stud. A lug 161 punched forwardly from the upper end of the rockable arm 151 has a laterally tight fit in a slot 162 punched in the insulating yoke 153. Figures 8 and 9 illustrate the two limits of swinging movement of the pivoted arm 151, corresponding to the On and Off positions of the switch actuator 50.

As shown in Figures 8 and 9, the left hand corner of the insulating yoke 153 is provided with an aperture 164 in which is staked a small, flat metallic lug 165 comprising a front portion extending forwardly of the insulating yoke. Projecting outwardly from the upper edge of this lug 165 is a small spring-seating projection 167. In like manner, the adjacent end of the contact bearing spring 118 is also formed with a small spring-seating projection 169 disposed in substantially the same plane with the spring-seating projection 167. Engaging over these spring-seating projections is a U-shaped type of over-center snap spring 171. The ends of this snap spring have outwardly inclined lips 172 for engaging under the end of the leaf spring and the end of the switch actuating lug 165. Punched in the snap spring directly above the lips 172 are small slots 173 which engage over the spring retaining projections 167, 169 for holding the snap spring against the possibility of accidental displacement. It will be seen from Figure 8 that when the switch actuator 50 is swung into the substantially vertical position illustrated in this figure, the spring 171 is actuated with an over-center snap action to snap the movable contact into closed circuit position. Similarly, it will be seen from Figure 9 that when the switch actuator 50 is swung into the inclined position shown in this figure, the spring 171 operates with an over-center snap action to separate the contacts with a snap motion. The two limits of movement of the switch actuator are defined by a stop lug 175 which projects forwardly from the upper edge of the base plate 64 and which is adapted to be engaged by the opposite ends of an arcuate slot 176 formed in the upper edge of the switch actuating yoke 153. The over-center snap spring 171 is the only spring acting rotatively on the switch actuator 50, this spring possessing enough energy to complete the pivotal movement of the switch actuator in either direction, once the movement of the switch actuator has been initiated in that direction and carried to the over-center snap point.

The two tripping pins 48a and 49a, which respond to the On and Off actuation of the tripping lugs 48 and 49, and the manual lever 35, which responds to manual manipulation from the outside of the housing, constitute parts carried by or extending from a slide plate 181 which is mounted on the front side of the pivoted arm 151. This slide plate 181 is capable of spring resisted movement in two planes relatively to the pivoted arm 151, viz. it is capable of endwise sliding movement in a downward direction relatively to the length of the pivoted arm 151, and it is also capable of inward tilting or deflecting motion wherein the upper end of the slide plate is tilted or deflected inwardly toward the pivoted arm. It will be seen that the two tripping pins 48a and 49a are mounted directly in this slide plate, and that the manually actuated lever 35 constitutes a lateral extension of the slide plate. The upper portion of said plate has a guide slot 183 extending longitudinally of the plate, this slot having a free guided fit over the shank of the pivot stud 152. The guide slot permits the above described endwise sliding movement of the slide plate 181 relatively to the pivot stud 152, and also permits said inward deflecting movement of the upper end of the slide plate relatively to the pivot stud. A head 185 on the outer end of the pivot stud overlies the side margins of the slot 183 and limits outward deflecting movement of the upper end of the slide plate relatively to the pivot stud and remainder of the assembly. The lower end of the guide slot 183 is formed with an enlarged circular portion 184 capable of passing over the stop head 185 in the operation of assembling the parts, but in the normal movement of the slide plate this enlarged end 184 never comes into registry with the stop head 185.

Attention is directed to the fact that the On tripping pin 48a and the Off tripping pin 49a both lie substantially below the axis of the pivot stud 152, around which the swinging movement of the switch actuator occurs. Thus, in the downward (clockwise) direction of rotation of the On tripping lug 48 and the Off tripping lug 49, these lugs will engage their respective tripping pins 48a and 49a at points substantially below the pivot axis of the switch actuator.

Referring again to the mounting of the slide plate 181, the lower end of this plate is formed with a narrowed guide extension 186 which passes through a guide slot 187 punched out of a bottom leg 188 extending forwardly from the lower end of the pivoting arm 151. The guide extension 186 is capable of endwise sliding movement in the guide slot 187 and is also capable of the rocking movement which occurs when the upper end of the slide plate is deflected inwardly. Punched out in the lower portion of the slide plate 181 is an opening 189 in which is confined a compression spring 191 which acts between the upper end of the opening 189 and the upper side of the leg 188, normally tending to slide the slide plate into the upper position illustrated in Figures 8 and 9. A tongue 192 extending downwardly from the slide plate into the upper portion of the opening 189 retains the spring 191 properly located with respect to the slide plate and guide leg 188. The upward movement of the slide plate under the action of this spring is limited by a stop lug 193 which projects from the cross bar portion 194 at the lower end of the guide extension 186. In the assembly operation, this stop lug 193 lies in the same plane as the remainder of the slide plate, and hence it passes freely through the guide slot 187, in which assembly operation the circular opening 184 at the low end of the upper guide slot 183 is passed down over the stop head 185 of the pivot stud. After the parts have been thus assembled, the stop lug 193 is punched or bent rearwardly, as clearly shown in Figures 7 and 11, and in this rearwardly bent position it strikes the under side of the guide leg 188 and thus functions as a limiting stop for limiting the upward sliding movement of the slide plate.

Referring to Figure 7, inward deflecting movement of the upper end of the slide plate 151 is yieldingly resisted by a thin leaf spring 195 which has its lower portion anchored to the front side of the pivoted arm 151 by a rivet 196. This leaf spring is also held against the possibility of pivoting movement around the rivet 196 by extending a tongue 197 at the lower end of the spring into a notch 198 formed in the guide leg 188. The upper edge of the leaf spring 195 is formed with a bifurcating slot 199 which embraces the pivot stud 152, and this bifurcated upper end of the spring bears resiliently against the back side of the slide plate 151 at a point above the pivot stud for normally holding the slide plate pressed forwardly in the normal position illustrated in Figure 7.

In this forwardly pressed position of the slide plate, the two tripping pins 48a and 49a lie in the vertical plane of rotary movement of their respective On tripping lug 48 and Off tripping lug 49. This vertical plane or path of rotary movement is indicated by the dash-and-dot lines P in Figures 7, 11 and 13. Hence, when the slide plate 151—and manual control lever 35—occupy this forward position shown in Figure 7, the tripping pins 48a and 49a are successively engaged by the tripping lugs 48 and 49 in the automatic performance of the time cycle, such automatic control phase of the operation being illustrated in Figures 8 and 9. Attention is directed to the fact that the pin contacting surface of the tripping lug 49 is sloped at a non-radial angle indicated by the dash-dot line x in Figure 8, which angle is such as to exert a deflecting force on the tripping pin 49a in an outward or counterclockwise direction. This augments the counterclockwise torque force that the downward thrust sets up in the pin 49a because of the location of this pin below and to the left of the pivot pin 152. The combined deflecting and torque forces oscillate the switch actuator 50 in a counterclockwise direction around the pivot stud 152 for swinging the switch actuator 50 from the switch closing position of Figure 8 to the switch opening position of Figure 9. Similarly, the pin contacting face of the On tripping lug 48 is also sloped at a non-radial angle, except that this angle is in the opposite direction, as indicated by the dash-dot line y in Figure 9. Hence, when this tripping lug 48 engages its tripping pin 48a it will exert an inward deflecting force on this pin, which augments the clockwise torque force set up in the switch actuator by the downward pressure on the tripping pin 48a. This rotates the switch actuator 50 in a clockwise direction from the switch opening position of Figure 9 to the switch closing position of Figure 8.

Prior to either of the tripping pins 48a or 49a being thus deflected pivotally in an inward or outward direction by the tripping lugs 48 and 49, these pins are first pushed downwardly by their respective tripping lugs 48 and 49. This is in the manner of a downward sliding movement of the tripping pins, permitted by the spring resisted slide mounting of the slide plate 181. As each tripping lug 48 or 49 contacts its respective tripping pin 48a or 49a it will start pushing this pin ahead of it in a downward direction. This downward sliding motion of the pin and slide plate 181 will continue until the top end of the key-hole guide slot 183 strikes the shank of guide pin 152, at which point the downward sliding movement of the tripping pin positively stops. In Figure 8 the approximate limit of this downward sliding movement of tripping pin 49a is indicated in dotted lines at 49a, and in Figure 9 the corresponding lower limit of sliding movement of the tripping pin 48a is indicated in dotted lines at 48a′. As soon as either tripping pin reaches this limit of downward sliding movement 48a′, 49a′, that pin thereupon starts swinging laterally under the deflecting and torque forces referred to above, namely the deflecting force exerted by the sloping under surface of the respective tripping lug 48 or 49, and by the torque force which arises in the pin because it is located below the pivot pin 152 and swings as a crank pin toward a dead center position directly below the axis of said crank pin. It is this lateral deflecting motion of the tripping pin that swings the switch actuator assembly 50 and operates the movable switch contact 115. The swinging motion of the switch actuator 50 progresses slowly until the snap spring 171 passes its "over center"

point, whereupon this snap spring instantly snaps the switch actuator 50 through to the completion of its movement, and also snaps the movable switch contact 115 into its other position, corresponding to the new position of the switch actuator 50. This final snap swinging movement of the switch actuator 50 instantly swings the operative tripping pin beyond the edge of its respective tripping lug, i. e. the pin 49a is instantly swung outwardly beyond the outer edge of its lug 49, or the pin 48a is instantly swung inwardly beyond the inner edge of its lug 48, depending upon which tripping pin has just been operative. Thereupon, this operative tripping pin—and slide plate 181—are free to be snapped in an upward direction by the action of the coiled compression spring 191 thrusting upwardly on the slide plate 181. When the operative tripping pin has thus been snapped back up from the dotted line position to the full line position, shown in Figures 8 and 9, the pin is well past or above the thickness of its respective tripping lug 48 or 49. Hence, there is nothing to stop either of these tripping pins 48a and 49a—and the switch actuator 50—from being immediately swung back manually to the position occupied before the automatic switching operation—instantly upon the completion of the switching operation if desired. Hence, the user of the switch can perform an immediate manual control operation to return the switch instantly to its previous condition, if the automatic timing operation should occur at an inopportune time, accidentally or otherwise. For example, if some or all of the lights of a house circuit should be on automatic control to go off at midnite, and if the host should forget this setting when starting a bridge game, the cutting off of the lighting circuit in the middle of the bridge game need not cause inconvenience for any appreciable time, because the host can instantly throw the manual control lever 35 back to the On position. Without the above described feature, he might have to wait anywhere from 10 minutes to possibly 30 minutes until the tripping pin 49a had cleared the thickness of the tripping lug 49.

Referring now to the more detailed manual control operations performed by the manual control lever 35, when this control lever and slide plate unit is in its normal forward position shown in Figure 7, the control lever is in readiness to actuate the switch into temporary On condition or into temporary Off condition anytime that either of these conditions is desired. That is to say, by merely swinging this control lever downwardly or upwardly in the housing opening 40 between the two positions shown in Figures 8 and 9, the switch can be moved into closed or open condition, in which condition it will remain temporarily. However, this is merely a temporary condition because the tripping pins 48a and 49a are still in the paths P of the tripping lugs 48 and 49, to be engaged and actuated thereby in the continued automatic cycle of the timer. The opening 40 in the housing through which the control lever 35 extneds, has an inwardly extending rear wall 201 on which are marked the upper indicia "Off" and the lower indicia "On" (Figure 1) for denoting the condition of the switch when the manual control lever 35 is moved into either of these upper or lower positions. Such indicia apply both to the temporary On and temporary Off control positions of the lever, as well as the permanent On and permanent Off positions. When the lever is swung vertically into either of these On or Off positions, for effecting either a temporary or a permanent control of the switch, the lever does not quite cover the corresponding indicia, so that it is easy to tell from the front of the housing the position then occupied by the switch.

Referring now to the permanent On and permanent Off control positions of the lever 35, the opening 40 has sufficient fore and aft depth to accommodate rearward deflecting movement of the lever into the lower and upper rearward positions illustrated in Figures 11 and 13. Thus, the control lever 35 is movable into four different positions, comparable to the movement of the selective speed transmission lever into the four positions of the H-slot which was conventional in the older automobiles. When the control lever 35 is moved into either the lower or upper rearwardly deflected position, it is adapted to be latched or held in these positions by a notched or slotted plate portion 204 which is preferably formed as a forwardly bent integral extension of the base plate 64 (Figures 11 and 13) lying behind and in registry with the opening 40. The forward edge of this plate portion is formed with an entrance slot or notch 205, which opens into lower and upper slots 206 and 207 having detent shoulders 208 and 209 respectively at their front edges. The control lever 35 can only move back through the entrance slot 205, into its rearwardly deflected position, when the lever and switch actuator are in the On position. When the lever is in its rearwardly deflected position, downward sliding movement of the lever and slide plate 181 brings the lever into locking engagement in the lower locking slot or notch 206, in which position it is permanently held by the lug 208, corresponding to the permanent On condition of the switch, until the control lever is amnually released. The length of the guide slot 183 in the slide plate 181 accommodates this downward sliding movement of the control lever. On the other hand, when the control lever (and slide plate) are revolved upwardly in this rearward plane, the lever is brought into engagement in the upper locking notch 207, in which upper rearwardly deflected position it is held by the detent lug 209, corresponding to the permanent Off condition of the switch, until the control lever is manually released. It will be seen from Figures 11 and 13 that when the manual control lever is positioned in either of the locking notches 206 or 207, the two switch tripping pins 48a and 49a have been tilted rearwardly to a point where they are out of the paths of movement P of their respective tripping lugs 48 and 49. Hence, these tripping lugs cannot perform an automatic control on the switch actuator and switch in accordance with their time setting relative to the dial. Instead, the switch actuator and switch remains permanently On—if the manual control lever is latched into the bottom notch 206; or remains permanently Off if the manual control lever is latched into the upper notch 207.

Referring to Figure 5B, the movement of the control lever 35 into the above described four different control positions is made easily understandable to the user by mounting an indicating plate 215 directly upon the control lever 35 within the housing 20, which indicating plate bears the four position indicatng letters "A," "B," "C" and "D" for selective presentation at the sight opening 40 in the housing. This indicating plate is provided with a slot 216 which fits snugly over the shank of the control lever 35 immediately in back of or on the inner side of the opening 40, and the indicating plate is preferably curved to maintain its outer surface in close proximity to said opening. The four control position letters "A"–"D" are so located on the outer surface of the indicating plate that only one of these letters is visible at a time in the opening 40, as shown in Figure 3, the visible letter denoting the position then occupied by the manual lever.

The four control positions of the manual control lever 35 may be briefly summarized by reference to the diagram of Figure 14 in which these four positions are designated A, B, C and D, each indicating one of the four positions as follows:

Temporary Off: If the appliance is On and it is desired to turn it off temporarily, the manual control lever is shifted up to position "A." The appliance will stay off until it is turned on automatically by the On tripper of the time wheel. Thus, the original time cycle is resumed automatically when the next regularly scheduled On time occurs.

Temporary On: If the appliance is off and it is desired to turn it on temporarily, the manual lever is shifted down to position "B." The appliance will stay on until it is turned off automatically by the Off tripper of the time wheel. Thus, the original time cycle is resumed automatically when the next regularly scheduled Off time occurs.

Permanent Off: To omit the daily automatic timing operation and current from flowing to the appliance, the manual lever is shifted up to position "C." When it is desired to use the appliance again and to resume the daily automatic timing, the manual lever is shifted to position "A" or "B," depending upon whether the appliance is scheduled to be Off or On according to the set time cycle.

Permanent On: To omit the daily automatic timing operation while keeping electrical current flowing to the appliance, the manual lever is shifted down to position "D." The appliance can then be turned on or off by using the controls on the appliance itself. If it is desired to resume the daily automatic timing operation after a few days or weeks, the manual lever is shifted to position "A" or "B," depending on whether the appliance is scheduled to be Off or On according to the set time cycle.

Our improved construction has also been designed to simplify as much as possible the wiring and assembly operations for the purpose of keeping assembly costs to a minimum. It will be noted that all of the wiring connections from the supply cord to the binding post terminals, electric switch, electric motor and the outlet receptacle 30 can be completed outside of the housing before any of these parts are inserted into the housing. The frame plate 64 carries the electric motor, switch contacts and switch actuator, including the manual lever 35, so that all of these parts can be externally assembled as one sub-assembly adapted to be inserted into the housing as a unit from the rear of the housing. In inserting this sub-assembly into the housing the manual lever 35 can be inserted diagonally through the relatively wide opening 40 in the side of the housing, so that there is no need of performing any separate assembly operation with respect to this manual lever, notwithstanding the fact that it projects considerably from the side of the housing. When this sub-assembly carried by the base plate 64 has been inserted into the housing, the base plate is secured in place by the cap screws 108, as previously described. The outlet receptacle 30 can then be slid into the slot-like opening 138 formed in the side wall for its reception, following which the rear cover plate 27 is secured in place to close off the entire rear end of the housing, such cover plate holding the outlet receptacle 30 against the possibility of outward displacement. The dial sub-assembly illustrated in Figure 6 can then be mounted from the front side of the timer, this dial sub-assembly being slipped over the mounting spindle or stud 62 and being held in place thereon by the lock washer 76. The spur gear 94 on the rear end of the dial bushing 61 is meshed with the spur pinion 95 in the act of assembling the dial sub-assembly over the stationary mounting spindle 62. All of the parts of the dial sub-assembly have been previously assembled before being inserted into the housing over the mounting spindle 62. The placing of the front trim cap 42 over the cap base 71 completes this front assembly operation.

While we have illustrated and described what we regard to be the preferred embodiment of our invention, nevertheless it will be understood that such is merely exemplary and that numerous modifications and rearrangements may be made therein without departing from the essence of the invention.

We claim:

1. In a time switch adapted for automatic and manual control, the combination of switch contacts, a switch actuator operable in one direction of movement to close said switch contacts and operable in the other direction of movement to open said switch contacts, automatic time control mechanism for automatically operating said switch actuator to close and to open said switch contacts at preset times, said automatic time control mechanism comprising a time driven dial and a plurality of tripping lugs adjustably carried thereby for automatically operating said switch actuator at said preset times, and manual control mechanism for manually operating said switch actuator and operable to super-impose a manual control over the automatic control thereof, said manual control mechanism comprising means operative to actuate said switch actuator to restore said switch contacts to closed position immediately after said automatic control mechanism has automatically moved them to open position, and to retain said switch contacts in closed position until they are again actuated to open position by said automatic control mechanism.

2. In a time switch adapted for automatic and manual control, the combination of switch contacts, switch actuating means for actuating said switch contacts, automatic control mechanism for automatically operating said switch actuating means to close and to open said switch contacts at preset times, said automatic control mechanism comprising a time driven dial and tripping means carried thereby for automatically operating said switch actuating means at said preset times, and manual control mechanism operative to super-impose a manual control over the automatic control effected by said automatic control mechanism, said manual control mechanism comprising means which is operative to actuate said switch actuating means to restore said switch contacts back to a first position immediately after said automatic control mechanism has automatically moved them from said first position into a second position, and also to retain said switch contacts in said first position until they are again actuated into said second position by said automatic control mechanism or by said manual control mechanism.

3. In a time switch adapted for automatic and manual control, the combination of switch contact means, a switch actuator operable in one direction for closing said switch contact means and operable in the other direction for opening said switch contact means, time control mechanism for automatically operating said time switch at a preset time comprising a time driven dial and two tripping lugs adjustably carried thereby adapted to engage said tripping pin means for automatically operating said switch actuator first in one direction and then in the other direction at said preset times, and manual control mechanism for manually operating said time switch comprising means for establishing an operating clearance between said tripping pin means and the paths of movement of both of said tripping lugs to render said switch actuator non-responsive to said automatic time control mechanism during the time that it is desired to retain the time switch under manual control, said manual control mechanism being operative to establish said operating clearance immediately after said switch contact means has been operated by said switch actuator pursuant to engagement by either of said two tripping lugs.

4. In a time switch of the class described, the combination of switch contacts, a switch actuator operable in opposite directions for closing and opening the latter, a time driven dial, tripping means adjustably carried by said time driven dial and adapted in the normal operating relation thereof to operate said switch actuator first in one direction and then in the other direction, and manual control means actuatable to render the normal operating relation between said tripping means and said switch actuator non-effective immediately after automatic operation of said switch actuator by said tripping means and to place said switch contacts selectively in a permanently On position or in a permanently Off position.

5. In a time switch of the class described, the combination of switch contacts, a switch actuator for actuating the latter, said switch actuator comprising a tripping pin, time control mechanism comprising a time driven dial and a tripping lug carried thereby adapted to engage said tripping pin for automatically operating said switch actuator at a preset time, said switch actuator comprising a pivotally swinging arm adapted to actuate said switch contacts upon pivotal movement of said arm, a mounting member on which said tripping pin is mounted, means supporting said mounting member on said pivotally swinging arm for movement in a separate plane independent of the pivotal swinging movement of said arm for displacing said tripping pin from the path of movement of said tripping lug, and a manually operable member for moving said pin mounting member in said independent path for deflecting the tripping pin out of the path of said tripping lug.

6. In a switch of the class described adapted for automatic time control and for manual control, the combination of switch contact means, switch actuating mechanism comprising a pivoted switch actuator arranged to actuate said switch contact means to closed position when swung in one direction and to actuate said switch contact means to open position when swung in the other direction, a time driven dial, On and Off tripping lugs carried by said dial adapted to swing said pivoted switch actuator in opposite directions, a slide plate mounted on said pivoted switch actuator for tilting movement and also for sliding movement relatively thereto, On and Off tripping pins carried by said slide plate adapted to be engaged by said On and Off tripping lugs carried by said time dial, a manual control lever connected with said slide plate and operative to tilt said plate relatively to said pivoted switch actuator for moving said tripping pins out of the path of said tripping lugs, said control lever being operative to pivot said switch actuator into either of its switch opening or switch closing positions, and detent means operative upon sliding movement of said slide plate relatively to said switch actuator to hold said tripping pins out of the path of said tripping lugs.

7. In a switch of the class described adapted for automatic time control and for manual control, the combination of switch contacts, a time driven dial, an On tripping lug and an Off tripping lug adjustably mounted on said time driven dial for effecting automatic operation of said switch contacts at preset times, switch actuating mechanism comprising a pivotally swinging arm operatively connected with one of said switch contacts whereby swinging movement of said arm in one direction closes said contacts and swinging movement of said arm in the other direction opens said contacts, a slide plate mounted on said pivotally swinging arm for tilting movement relatively to said arm and for endwise sliding movement relatively thereto, an On tripping pin and an Off tripping pin carried by said slide plate and adapted to be engaged respectively by said On tripping lug and by said Off tripping lug of said time dial for swinging said pivoted arm, spring means acting between said pivoted arm and said slide plate for normally holding said plate in a position with said pins interposed in the paths of said tripping lugs, a manual control lever extending from said slide plate and operative to tilt said plate relatively to said pivoted arm in a direction for moving said tripping pins out of the paths of said tripping lugs, and latching means operative to be engaged by said manual control lever when said lever and slide plate are given a sliding movement relatively to said pivotally swinging arm while the pins are tilted out of the path of said tripping lugs.

8. In a time switch, the combination of a time driven dial, tripping means carried by said dial, a switch actuator adapted to be operated by said tripping means, switch contact means responsive to said switch actuator, a manual control member arranged for movement selectively into any one of four different control positions, and means responsive to movement of said manual control member into two of said four positions for establishing a temporary On or a temporary Off condition in said switch, which temporary condition will be maintained automatically until tripped by said tripping means and responsive to movement of said manual control member into the other two of said four positions for establishing a permanent On or a permanent Off condition in said switch.

9. In a time switch of the class described, the combination of a housing, a time driven dial carried thereby, tripping means adjustably carried by said dial, a switch actuator in said housing adapted to be operated by said tripping means, switch contact means responsive to said switch actuator, a manual control lever projecting from said housing, means defining four selective positions into which said lever may be moved from the exterior of said housing, means coacting with said switch actuator and control lever whereby the movement of said lever into two of said four positions places said switch in the condition of temporary On or temporary Off, and whereby the movement of said lever into the other two positions places the switch in the condition of permanent On or permanent Off, and means for automatically maintaining said switch in said condition of temporary On or temporary Off until tripped by said tripping means.

10. In a time switch, the combination of switch contact means, time driven means, tripping means moving with said time driven means, switch actuating means operable in opposite directions of movement in response to said tripping means for automatically actuating said switch contact means from one position to another position at preset times, and manual control means for actuating said switch contact means and cooperatively related to said switch actuating means to enable said manual control means to restore said switch contact means from the second of said positions back to the first of said positions immediately after automatic actuation by said tripping means, whenever it is desired to effect such immediate manual restoration without delay, said manual control means automatically remaining in such switch restoring position after such immediate manual restoration has been effected.

11. In a time switch, the combination of switch contact means, switch actuating means operable in opposite directions of movement to actuate said switch contact means to closed and open positions, time driven means, first and second tripping members adjustably carried by said time driven means, first and second tripping projection means associated with said switch actuating means and adapted to be engaged by said first and second tripping members respectively for effecting automatic operation of said switch contact means at preset times, a manual control member connected to actuate said switch contact means manually, and means enabling said first tripping projection means to take a position which is clear of said first tripping member, or said second tripping projection means to take a position which is clear of said second tripping member immediately upon automatic actuation of said switch contact means by either of said tripping members, whereby to enable said manual control member to effect an immediate manual restoration of said switch contact means to its former position after automatic operation whenever such immediate manual restoration is desired, said manual control member remaining in such switch restoring position after such immediate manual restoration has been effected and after said manual control member has been manually released.

12. In a time switch, the combination of a pair of cooperating stationary and movable switch contacts, a time driven dial, an On tripping lug and an Off tripping lug adjustably mounted on said time driven dial, a pivotally mounted switch actuator, snap spring means operatively connected between said switch actuator and said movable switch contact, an On tripping pin and an Off tripping pin adapted to be engaged respectively by said On tripping lug and said Off tripping lug, a pin carrying plate on which both of said tripping pins are mounted, said pin carrying plate being supported on said switch actuator and having a normal position relatively thereto, guide means effective between said pin carrying plate and said switch actuator permitting said plate to have a limited sliding movement and a limited tilting movement relatively to said switch actuator, spring means yieldingly resisting both of such movements, and a manual operating lever extending from said plate, said spring means permitting either tripping pin to follow the path of movement of its respective tripping lug through the limited sliding movement of said plate prior to switch operation for enabling the actuated pin to clear its respective tripping lug upon the return sliding movement of said plate immediately after switch operation, said spring means also permitting said pin carrying plate to be tilted by said manual operating lever in a direction to move said tripping pins out of the paths of their respective tripping lugs.

13. In a time switch of the class described, the combination of a pair of cooperating stationary and movable switch contacts, a time driven dial, an On tripping lug and an Off tripping lug adjustably mounted on said time driven dial, switch actuating mechanism comprising a pivotally mounted arm, snap spring means operatively connecting said arm with said movable switch contact, a plate carried by said arm and having a normal position relatively thereto, an On tripping pin and an Off tripping pin carried by said plate and adapted to be engaged respectively by said On tripping lug and said Off tripping lug for imparting timed switch operating swinging movement to said pivoted arm, guide means mounting said plate on said arm for sliding movement in a path approximately tangential to and in the direction of the movement of said tripping lugs, spring means yieldingly resisting such sliding movement of said plate from said normal position, stop means for limiting the degree of such sliding movement, such spring resisted sliding movement permitting the actuated tripping pin to follow the movement of its actuating tripping lug through a limited range for enabling the tripping pin to clear its tripping lug upon the spring return movement of said plate following switch actuation, guide means permitting a limited tilting movement of said plate relatively to said pivoted arm, spring means yieldingly resisting such tilting movement, a manual operating lever extending from said plate and operative to impart pivotal switch actuating motion to said pivoted arm through said plate, said manual control lever being operable to tilt said plate in a direction to carry said tripping pins out of the paths of movement of their respective tripping lugs, and latch means enabling said manual control lever to be latched in said latter position.

14. In a time switch, the combination of switch contact means, a time driven dial, an On tripping lug and an Off tripping lug rotating with said time driven dial, one of said lugs rotating in an inner circular path of movement of one radius and the other lug rotating in an outer circular path of movement of a larger radius, and one of said lugs having a camming face sloped non-radially in one direction with respect to its circular path of movement and the other lug having a camming face sloped non-radially in the other direction with respect to its circular path of movement, a pivotally swinging switch actuator, snap spring means operatively connecting said switch actuator with said switch contact means, a pivot pin defining a fixed pivot axis for said switch actuator lying between said inner and outer circular paths of movement of said tripping lugs, On and Off tripping pins carried by said switch actuator and adapted to be engaged by the camming faces of their respective On and Off tripping lugs, said tripping pins being located on said switch actuator at points which are beyond the fixed pivot axis of said actuator with respect to the circular paths of movement of said tripping lugs, whereby the engagement of the camming face of the lug rotating in the inner path of movement tends to deflect its respect tripping pin in an outward direction, and whereby the engagement of the camming face on the lug rotating in the outer circular path of movement tends to deflect its respective tripping pin in an inward direction, and manual means operable to actuate said switch contact means.

15. In a time switch of the class described, the combination of a housing, a time driven dial carried therein, tripping means carried by said dial, a switch actuator in said housing adapted to be operated in opposite directions of movement by said tripping means, switch contact means movable into closed and open positions by the opposite directions of movement of said switch actuator, an opening in said housing, a manual control lever projecting from said housing through said opening, means defining four selective positions into which said lever may be moved from the exterior of the housing, means coacting with said switch actuator and control lever whereby the movement of said lever into two of said positions places said switch contact means in the condition of temporary On or temporary Off, and whereby the movement of said lever into the other two of said positions places the switch in the condition of permanent On or permanent Off, means for automatically holding said control lever in the positions of temporary On and temporary Off until said switch actuator is oppositely actuated by said tripping means and an indicating plate disposed within said housing on the inner side of said opening and connected with said manual control lever for moving therewith, said indicating plate carrying indicia adapted to indicate through said opening which of the four positions said manual control lever is then occupying.

16. In a time switch of the class described, the combination of a time driven dial, switch closing and switch opening tripping devices adapted to be driven by said time driven dial and adjustable to different time settings relatively to said dial, said tripping devices having switch closing and switch opening tripping lugs rotating with said time driven dial in different paths of movement, switch contact means, a pivoted switch actuator, over-center snap spring means connecting said switch actuator with said switch contact means whereby pivotal motion of said switch actuator in one direction moves said switch contact means to closed position and pivotal movement of said switch actuator in the other direction moves said switch contact means to open position, two tripping projections on said switch actuator arranged to alternately occupy positions in the different paths of movement of said switch closing and switch opening tripping lugs, whereby one of said tripping projections is adapted to be engaged by said switch closing tripping lug for causing pivotal movement of said switch actuator in one direction for moving said switch contact means to closed position, and whereby the other of said tripping projections is adapted to be engaged by said switch opening tripping lug for causing pivotal movement of said switch actuator in the other direction for moving said switch contact means to open position, and spring urged means yieldingly mounting said two tripping projections on said switch actuator for permitting limited yielding movement of said tripping projectons relatively to said switch actuator in the general direction of circular movement of said tripping lugs.

17. A time switch according to claim 16 wherein the switch actuator is provided with a manual control lever for manually closing and opening said switch contact means.

18. A time switch according to claim 16 wherein the switch actuator is provided with a manual control lever which carries the two tripping projections and by the manipulation of which said tripping projections are moved out of the paths of movement of said switch closing and switch opening tripping lugs.

References Cited in the file of this patent

UNITED STATES PATENTS

| | | |
|---|---|---|
| 1,942,074 | Townsend | Jan. 2, 1934 |
| 1,970,432 | Porter | Aug. 14, 1934 |
| 2,131,304 | Shaw | Sept. 27, 1938 |
| 2,288,636 | Malone | July 7, 1942 |
| 2,488,110 | Aitken | Nov. 15, 1949 |
| 2,505,573 | Prophet | Apr. 25, 1950 |
| 2,545,617 | Kaefer et al. | Mar. 20, 1951 |
| 2,633,508 | Miller | Mar. 31, 1953 |
| 2,662,942 | Winkler | Dec. 15, 1953 |

FOREIGN PATENTS

| | | |
|---|---|---|
| 549,193 | Great Britain | Nov. 10, 1942 |
| 612,576 | Germany | Apr. 29, 1935 |